Figure 1:
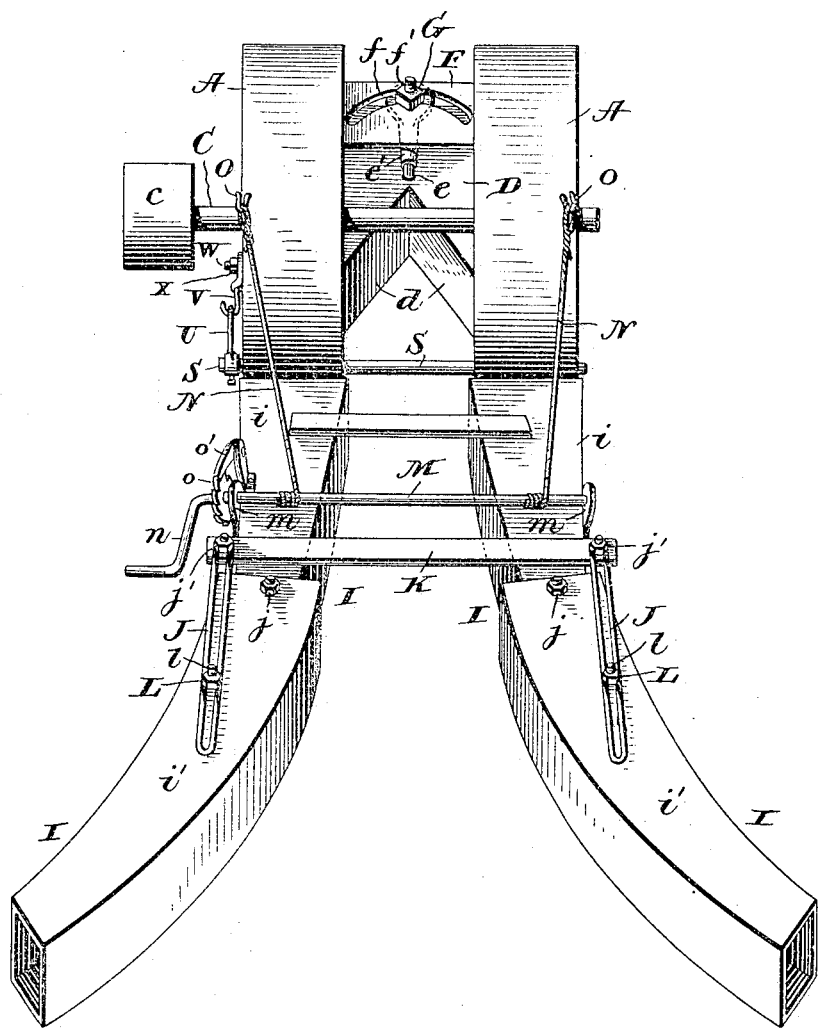

No. 787,917. PATENTED APR. 25, 1905.
H. P. HARPSTRITE.
DISTRIBUTING DEVICE.
APPLICATION FILED MAY 21, 1904.

2 SHEETS—SHEET 1.

Witnesses:
Jas. E. Hutchinson
H. E. Montague

Inventor:
Henry P. Harpstrite,
By Bacon & Milans, Attorneys

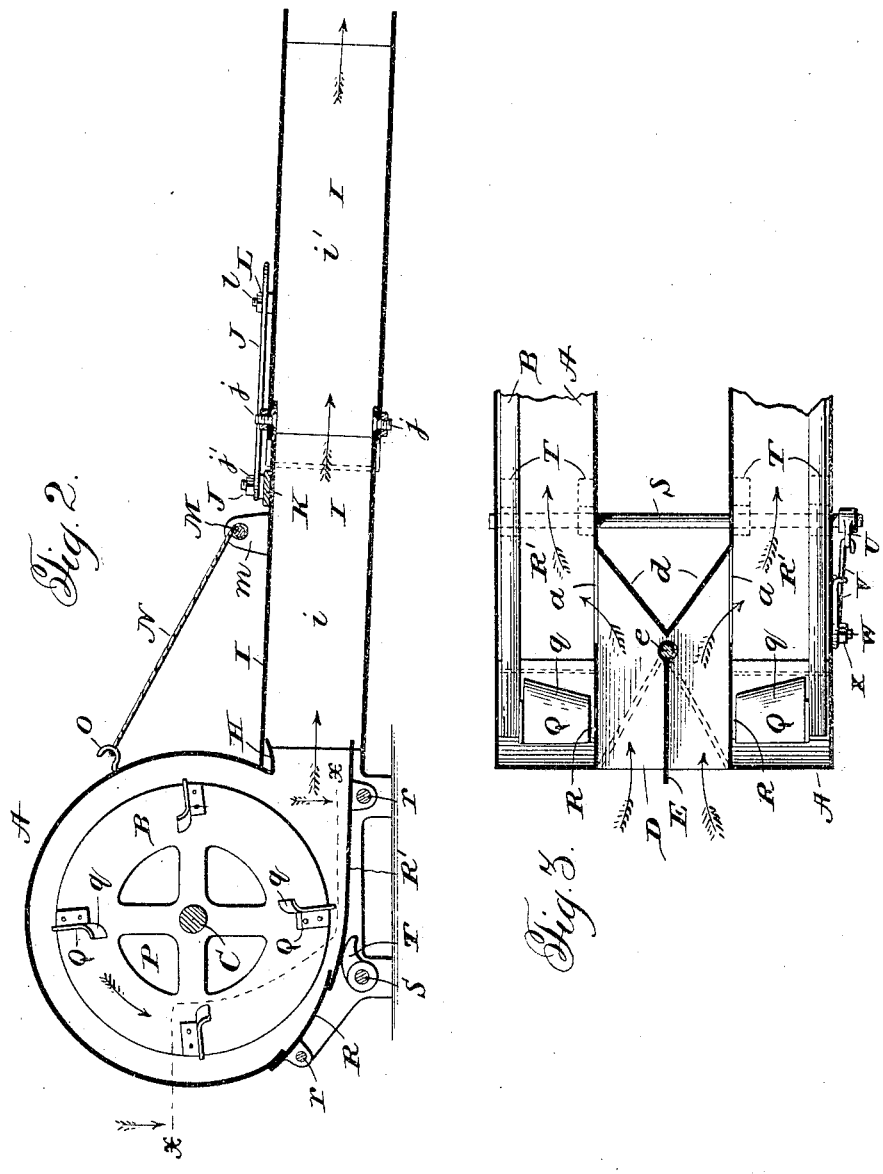

No. 787,917.

Patented April 25, 1905.

UNITED STATES PATENT OFFICE.

HENRY P. HARPSTRITE, OF MAROA, ILLINOIS.

DISTRIBUTING DEVICE.

SPECIFICATION forming part of Letters Patent No. 787,917, dated April 25, 1905.

Application filed May 21, 1904. Serial No. 209,134.

*To all whom it may concern:*

Be it known that I, HENRY P. HARPSTRITE, a citizen of the United States, residing at Maroa, in the county of Macon and State of Illinois, have invented certain new and useful Improvements in Distributing Devices, of which the following is a specification, reference being had therein to the accompanying drawings.

This invention relates to an improved distributing device susceptible of utilization in connection with various apparatus, though primarily designed for use as a car-loader for grain-elevators.

The invention contemplates the provision of a distributer of the character mentioned having a fan possessing novel structural characteristics which render the same efficient in receiving and ejecting the grain or other material.

The invention also comprehends a sidewise and vertically adjustable spout or spouts operatively related to a fan, whereby to receive the grain or other material from the latter and direct the same to a predetermined point or points of discharge.

The invention still further embraces the provision of means whereby either one or both of a pair of fans may be employed, as occasion may require.

The novel details in the construction and arrangement of the several parts of the device will be apparent from the detailed description hereinafter when read in connection with the accompanying drawings, forming part hereof, and wherein a convenient embodiment of the invention is illustrated.

In the drawings, Figure 1 is a perspective view of the device complete. Fig. 2 is a longitudinal sectional view through one of the fans and the spout immediately associated therewith; and Fig. 3 is a detail sectional view of the receiver arranged between the fans, taken on the line *x x* of Fig. 2 and looking in a downward direction.

Referring more specifically to the drawings, wherein like reference characters refer to corresponding parts in the several views, A designates similarly-formed fan-cases, preferably vertically disposed and arranged in parallel planes, the same containing the fans B, to be reverted to hereinafter, secured to the shaft C, operated by any suitable driving power through the medium of a belt-pulley *c* at one end of the shaft. Intermediate the fan-casings I mount a receiving-hopper D, having the diverging branches *d*, respectively, registering with a passage *a* in the inner side of one of the fan-casings A. Within the receiving-hopper an upwardly-directed deflector E is pivoted at *e*, the end of the pivot being formed into an operating-crank *e'*, the offset handle portion of which traverses a curved slot *f* in a guide-plate F, fixedly secured at its ends to the inner sides of the fan-casings, said offset or handle portion of the crank being screw-threaded, as at *f'*, for the reception of a binding-nut G, designed to lock the deflector in either a vertical central position to cause the incoming grain to feed into both fan-casings or in one of the inclined positions indicated in Fig. 3 to direct the whole of said incoming grain to either one of the fan-casings.

At the bottom of the fan-casings and arranged at one side thereof substantially tangentially of its periphery are the stub-nozzles H, constituting the outlet therefrom. Playing over these nozzles, so as to be adjustable vertically thereupon, are the discharge-spouts I, each having an inner section *i*, fixed against sidewise movement, and an outer extension or section *i'*, pivoted at *j* to provide for its lateral or sidewise adjustment through the medium of the elongated links J, pivoted at *j"* to a cross brace-rod K, connecting the sections *i* of the spouts and locked in adjusted positions by the nuts L engaging the fixed screws *l* on the movable sections *i'*. The sections *i'*, just referred to, are preferably curved outwardly and away from each other to enable the distribution of the discharge—for instance, toward both ends of a car or the like—as is obvious.

To afford an adequate means with which to adjust the spouts vertically upon the stub-nozzles H, the interfitting thereof being sufficiently loose to accommodate for such vertical movement of the spouts, a winding-shaft M is pivotally supported in brackets *m*, extending upwardly from the sections $i$ of the spouts, and fixed at one end to said shaft are cables N, engaging at their opposite end hooks O, fixed upon the fan-casings A. One end of the shaft is formed into a crank $n$, and it will be observed that as this crank is rotated in a forward or reverse direction the shaft M will be correspondingly actuated, thereby winding or unwinding the cables N to effect the elevating or lowering of the spouts, as the case may be. A toothed wheel $o$, fixed to the shaft and arranged to be engaged by the gravity-dog $o'$, locks the parts in their various positions.

The fans B, to which reference has heretofore been made, each consist of a disk or spider P and a series of blades Q, projecting laterally from the inner face thereof, to which they are secured, the outer edges of said blades being free. Each blade has an outwardly-inclined turned-over edge $q$, which will facilitate the pushing of the material fed into the fan-casings outwardly into the spouts, and this formation of the blades has been found to create a strong outward current or blowing effect.

It is desirable that there be some way of adjusting the bottom of the fan-casing relative to the fan, and for this purpose said bottom is formed of two sections R and R', overlapping at their adjacent edges, as clearly shown in Fig. 2, and respectively pivoted at their outer edges to the pivots $r$, engaging ears thereon, which register with corresponding ears on the inner and outer walls of the casings A. Underlying the overlapping edges of the pivoted sections of the bottom just referred to is a transversely-arranged shaft S, carrying cams or eccentrics T, abutting the under surface of the free end of the lowermost section, in the present instance the section R. An arm U, secured to the shaft S and arranged at the outside of one of the fan-casings, (it being understood that said shaft underlies both of the fan-casings to afford a common adjusting means,) constitutes a convenient operating means for rotating the shaft and the eccentrics or cams carried thereby to rock the sections R and R' of the bottom on their pivots to force the same toward or permit them to drop away from the fans, as desired. The link V, bolt W, and binding-nut X serve as a locking means for the parts just described.

It is to be understood that slight changes in the construction and arrangement herein disclosed may be made without departing from the spirit of the invention.

Having thus described the invention, what is claimed as new, and desired to be secured by Letters Patent, is—

1. In a distributing device of the character described, a pair of fans, a receiving-hopper interposed between the fans, and means within the hopper for directing the material fed thereinto to either of the fans or permitting the feeding of the material to both of said fans.

2. In a distributing device of the character described, a pair of fans, a receiving-hopper interposed between the fans, and an adjustable deflector in said hopper to adjust the feeding of the material to the fans.

3. In a distributing device of the character described, a pair of fans, a receiving-hopper interposed between the fans, an upwardly-directed pivoted deflector in said hopper for regulating the feeding of the material to the fans, and adjusting means for said deflector.

4. In a distributing device of the character described, a pair of fans, a pair of spouts flexibly connected to the fan-casings, means whereby said spouts may be adjusted vertically, and means whereby they may be adjusted laterally independently of each other.

5. In a distributing device of the character described, a pair of fans, a pair of spouts for receiving the material therefrom, and means whereby said spouts may be adjusted laterally independently of each other.

6. In a distributing device of the character described, fanning instrumentalities, a pair of spouts for receiving the material therefrom, and means whereby said spouts may be adjusted laterally independently of each other.

7. In a distributing device of the character described, a pair of fans, a pair of spouts for receiving the material therefrom, and means whereby said spouts may be adjusted both laterally independently of each other and vertically.

8. In a distributing device of the character described, a pair of fans, a pair of spouts leading from said fans in substantially the same general direction for receiving the material therefrom, and means independently operable with respect to each spout whereby said spouts may be shifted to adjust the same relative to the fans.

9. In a distributing device of the character described, a pair of fans, a receiving-hopper interposed between the fans, and an adjustable deflector in said hopper for regulating the feeding of the material to the fans.

10. In a distributing device of the character described, fanning instrumentalities, a pair of spouts for receiving the material therefrom, and means whereby said spouts may each be adjusted laterally independently of each other.

11. In a distributing device of the character described, fanning instrumentalities, a pair of spouts for receiving the material therefrom, and means whereby said spouts may each be adjusted laterally independently of each other and vertically.

12. In a distributing device, of the character described, a pair of fans, a pair of spouts for receiving the material therefrom, and means independently operable with respect to each spout whereby said spouts may be shifted to adjust the same relative to the fans.

13. In a distributing device of the character described, fanning instrumentalities, a pair of spouts leading therefrom in substantially the same general direction, and means independently operable with respect to each spout whereby said spouts may be shifted to adjust the same relative to the fans.

14. In a distributing device of the character described, a fan, a casing therefor, said casing having an adjustable bottom, and means for adjusting said bottom.

15. In a distributing device of the character described, a fan, a casing therefor, said casing having a pivoted bottom section, and means engaging the free end of said section for adjusting the same.

16. In a distributing device of the character described, a fan, a casing therefor, said casing having pivoted bottom sections overlapping each other at their free ends, and means operatively related to said overlapping ends for adjusting the same.

17. In a distributing device of the character described, a fan, said fan being composed of a supporting-spider, and laterally-disposed blades secured thereto, the inner operating edge of each blade being turned over.

18. In a distributing device of the character described, a fan, said fan being composed of a supporting-spider, and laterally-disposed blades secured thereto, the inner operating edge of each blade being outwardly inclined and turned over.

In testimony whereof I affix my signature in presence of two witnesses.

HENRY P. HARPSTRITE.

Witnesses:
F. R. GOODE,
E. S. PARKS.